US012265207B2

(12) United States Patent
Chan

(10) Patent No.: US 12,265,207 B2
(45) Date of Patent: Apr. 1, 2025

(54) DYNAMIC FOCUS FOR LASER PROCESSING HEAD

(71) Applicant: II-VI Delaware, Inc., Wilmington, DE (US)

(72) Inventor: Danny Chan, Kleinmachnow (DE)

(73) Assignee: II-VI DELAWARE, INC., Wilmington, DE (US)

( * ) Notice: Subject to any disclaimer, the term of this patent is extended or adjusted under 35 U.S.C. 154(b) by 630 days.

(21) Appl. No.: 17/192,327

(22) Filed: Mar. 4, 2021

(65) Prior Publication Data

US 2022/0283416 A1    Sep. 8, 2022

(51) Int. Cl.
*G02B 3/04*    (2006.01)
*B23K 26/06*    (2014.01)
(Continued)

(52) U.S. Cl.
CPC ...... *G02B 19/0014* (2013.01); *B23K 26/0665* (2013.01); *B23K 26/703* (2015.10); *G02B 3/04* (2013.01)

(58) Field of Classification Search
CPC ........ G02B 19/0014; G02B 3/04; G02B 7/08; G02B 7/10; G02B 7/09; G02B 7/102;
(Continued)

(56) References Cited

U.S. PATENT DOCUMENTS 4,353,617 A * 10/1982 Tokumitsu ............ G02B 13/22
                                                                   359/683
4,705,367 A * 11/1987 Eckbreth ................ G02B 13/22
                                                                   359/425
(Continued)

FOREIGN PATENT DOCUMENTS

CN    2293794 Y    10/1998
CN    2876815 Y  *  3/2007
(Continued)

OTHER PUBLICATIONS

Mortimer Abramowitz et al, Introduction to Lenses and Geometrical Optics, 2018, pp. 1-8 [online], [retrieved Apr. 20, 2023], retrieved from the Internet <URL: https://micro.magnet.fsu.edu/primer/lightandcolor/lensesintro.html>. (Year: 2018).*
(Continued)

*Primary Examiner* — Cara E Rakowski
*Assistant Examiner* — Wesley Scott Ashton
(74) *Attorney, Agent, or Firm* — Blank Rome LLP

(57) ABSTRACT

A laser processing head transmits a laser beam to a process zone. An input lens fixedly mounted in the head images the beam from an input with a first (negative) focal length along an optical axis. An intermediate lens is movably mounted in the head in connection with an actuator, which can move the intermediate lens along the axis at a variable lens distance relative to the input lens. The intermediate lens images the beam with a second (positive) focal length. An output lens fixedly mounted in the head images the beam with a third (positive) focal length along the axis to a focal point. The third focal length is greater than the second focal length and provides a large working distance. The focal point can be varied at a variable focal distance along the axis in relation to the variable lens distance by which the intermediate lens is moved.

17 Claims, 4 Drawing Sheets

(51) Int. Cl.
*B23K 26/70* (2014.01)
*G02B 19/00* (2006.01)

(58) Field of Classification Search
CPC ... G02B 7/04; G02B 7/02; G02B 7/00; G02B 1/041; G23K 26/0665; G23K 26/703; G23K 26/0648
See application file for complete search history.

(56) References Cited

U.S. PATENT DOCUMENTS

| | | | |
|---|---|---|---|
| 5,828,501 | A | 10/1998 | Menard et al. |
| 7,339,750 | B2 * | 3/2008 | Brustle .................. G02B 23/00 359/705 |
| 7,889,428 | B2 * | 2/2011 | Hayashi ............. G02B 21/0024 359/618 |
| 8,331,043 | B2 * | 12/2012 | Li .......................... G02B 9/12 359/753 |
| 8,331,044 | B2 * | 12/2012 | Li ...................... G02B 13/0005 359/784 |
| 8,804,238 | B2 | 8/2014 | Rupp et al. |
| 9,261,702 | B2 | 2/2016 | Chan |
| 9,329,368 | B2 * | 5/2016 | Rupp .................. B23K 26/046 |
| 9,346,126 | B2 * | 5/2016 | Watanabe ............. G02B 27/40 |
| 10,532,427 | B2 * | 1/2020 | Ohno .................... G02B 27/40 |
| 11,020,272 | B2 * | 6/2021 | Raksi .................. G02B 26/0875 |
| 11,780,029 | B2 * | 10/2023 | Tayebati ............. B23K 26/0626 219/121.64 |
| 2004/0080815 | A1 * | 4/2004 | Muys ................. B23K 26/0648 359/356 |
| 2010/0072180 | A1 | 3/2010 | Schuermann et al. |
| 2010/0116796 | A1 | 5/2010 | Jancso et al. |
| 2012/0154922 | A1 * | 6/2012 | Briand .................. G02B 27/30 219/121.72 |
| 2013/0162886 | A1 * | 6/2013 | Morooka ....... G02B 15/143107 359/684 |
| 2014/0268368 | A1 * | 9/2014 | Chan .................... B23K 26/073 359/717 |
| 2016/0368099 | A1 * | 12/2016 | Grapov .............. B23K 26/1476 |
| 2018/0154481 | A1 * | 6/2018 | Valentin ................. G02B 27/30 |
| 2019/0151997 | A1 * | 5/2019 | Blázquez-Sanchez ..................... B23K 26/0648 |
| 2019/0310463 | A1 * | 10/2019 | Boehmer ........... G02B 26/0816 |
| 2020/0254563 | A1 | 8/2020 | Grapov et al. |
| 2022/0063017 | A1 * | 3/2022 | Heinrici ................. B23K 26/26 |
| 2022/0334367 | A1 * | 10/2022 | Oguchi ................ G02B 26/101 |

FOREIGN PATENT DOCUMENTS

| | | | | |
|---|---|---|---|---|
| CN | 101035646 | A * | 9/2007 | ......... B23K 26/0648 |
| CN | 201201128 | Y | 3/2009 | |
| CN | 102974939 | A | 3/2013 | |
| CN | 104175003 | A * | 12/2014 | ........... B23K 26/067 |
| CN | 204248222 | U * | 4/2015 | |
| CN | 110471186 | A | 11/2019 | |
| CN | 111323927 | A | 6/2020 | |
| CN | 111736329 | A | 10/2020 | |
| CN | 111922514 | A * | 11/2020 | ......... B23K 26/0643 |
| CN | 112255764 | A * | 1/2021 | ............. B23K 26/06 |
| DE | 19825092 | A1 * | 12/1999 | ............. G02B 27/09 |
| DE | 202006012840 | U1 | 11/2006 | |
| DE | 102007039878 | A1 | 5/2008 | |
| DE | 102008048502 | A1 | 4/2010 | |
| DE | 102011117607 | A1 * | 5/2013 | .......... B23K 26/046 |
| DE | 102015108248 | A1 | 12/2016 | |
| DE | 102016005376 | A1 | 11/2017 | |
| DE | 102019108084 | A1 | 10/2019 | |
| EP | 1716963 | A1 | 11/2006 | |
| EP | 2651594 | A1 | 10/2013 | |
| EP | 3437783 | A1 | 2/2019 | |
| JP | 1995136790 | A * | 5/1995 | |
| JP | 3918583 | B2 | 5/2007 | |
| JP | 2017185543 | A * | 10/2017 | |
| JP | 2019018233 | A * | 2/2019 | |
| KR | 20110085487 | A * | 7/2011 | |
| WO | WO-2008019681 | A1 * | 2/2008 | ............. B23K 26/04 |
| WO | WO-2016205786 | A1 | 12/2016 | |
| WO | WO-2019082110 | A1 * | 5/2019 | |

OTHER PUBLICATIONS

Corey Boone, Properly Designing and Specifying Aspheric Lenses, 2020, pp. 1-8 [online], [retrieved May 2, 2023], retrieved from the Internet <URL: https://www.techbriefs.com/component/content/article/tb/supplements/pit/features/applications/36881>. (Year: 2020).*

Ross Team, Working with Ball Lenses, 2020, pp. 1-6 [online], [retrieved Jul. 30, 2023], retrieved from the Internet <URL: https://blog.rossoptical.com/blog/ball-lenses> . (Year: 2020).*

The Ultimate Guide to Optical Windows, 2020, pp. 1-15 [online], [retrieved Jul. 31, 2023], retrieved from the Internet <URL: https://www.firebirdoptics.com/blog/optical-window-ultimate-guide>. (Year: 2020).*

G.W. Moore, Laser Variable Focus/Flash on Fly Optical Head, 1982, pp. 1-3 [online], [retrieved Jan. 20, 2024], retrieved from the Internet <URL: https://priorart.ip.com/IPCOM/000048487>. (Year: 1982).*

Mortimer Abramowitz et al., Introduction to Lenses, 2015, pp. 1-5 [online], [retrieved Jan. 19, 2023], retrieved from the Internet <URL: https://micro.magnet.fsu.edu/optics/lightandcolor/lenses.html>. (Year: 2015).*

Mark E. Wilkinson et al., Optics Review (2017). (Year: 2017).*

Laser Processing Head BIMO (II-VI Incorporated 2020). (Year: 2020).*

Paul E. Nathnagle et al., Introduction to Stereomicroscopy, 2020, pp. 1-23 [online], [retrieved Jan. 22, 2024], retrieved from the Internet <URL: http://web.archive.org/web/20200731110829/https://www.microscopyu.com/techniques/stereomicroscopy/introduction-to-stereomicroscopy>. (Year: 2020).*

Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*

Applications of Optotune Lenses, 2012, pp. 1-9 [online], [retrieved Nov. 26, 2024], retrieved from the Internet <URL: https://priorart.ip.com/IPCOM/000218299>. (Year: 2012).*

P.S. Salter et al., Exploring the Depth Range for Three-dimensional Laser Machining with Aberration Correction, 22 Optics Express 17644-17656 (2014). (Year: 2014).*

Xu Yue et al., Optical Design of Dynamic Focusing System for Laser Processing, 2017, pp. 1-2 [online], [retrieved Nov. 26, 2024], retrieved from the Internet <URL: https://ieeexplore.ieee.org/stamp/stamp.jsp?tp=&arnumber=8119093>. (Year: 2017).*

Binh Xuan Cao et al., Automatic Real-time Focus Control System for Laser Processing Using Dynamic Focusing Optical System, 25 Optics Express 28427-28441 (2017). (Year: 2017).*

* cited by examiner

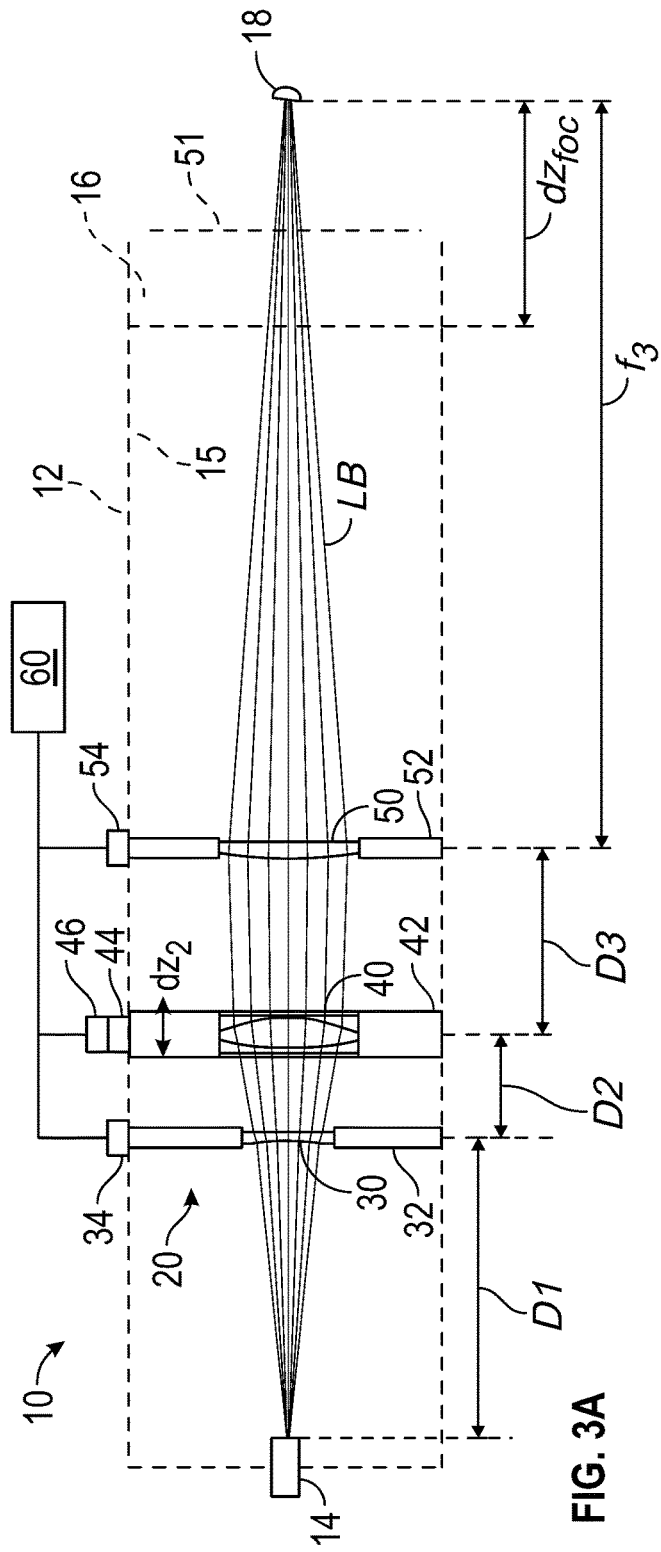
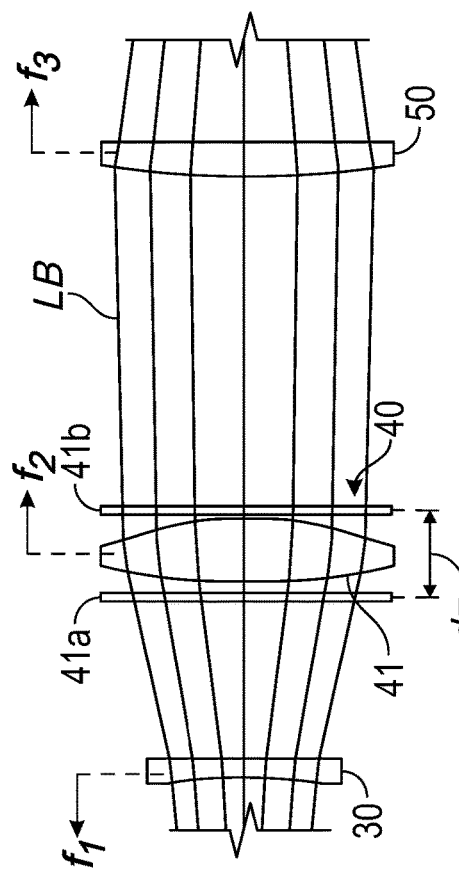
FIG. 3A
FIG. 3B

DYNAMIC FOCUS FOR LASER PROCESSING HEAD

FIELD OF THE DISCLOSURE

The present disclosure is directed to a high-power laser processing head configured to adjust its focal position dynamically while resisting contamination of the lenses and providing a large working distance.

BACKGROUND OF THE DISCLOSURE

A laser processing head, such as used for cutting or material processing, can provide a high-power laser beam of 10 kw and even up to 30 kW. Due to the working conditions, the high-power head is preferably resistant to contamination, which can damage the optics in the head and can undermine the laser's performance. In some laser processing heads, the focus position of the laser beam from the head can be adjusted along the optical axis.

Although existing arrangements to adjust the focus position may be effective, the configurations may not be well suited for harsh working conditions, high-power laser energy, exposure to contamination, and other issues that can damage the optics in the head and undermine the laser's performance. In addition, changing the focus position is a time critical operation and should be performed as quickly as possible. This can complicate the implementation of some arrangements.

The subject matter of the present disclosure is directed to overcoming, or at least reducing the effects of, one or more of the problems set forth above.

SUMMARY OF THE DISCLOSURE

A laser processing head is used to transmit a laser beam that is input along an optical axis of the head, to a process zone, the head comprises first, second and third lens elements, which can each include one or more lenses or optical elements. The first lens element is disposed in the head and images the laser beam from the input with a first focal length along the optical axis. The first focal length can be negative or can be positive for magnifications of about 6× or greater. The second lens element is disposed in the head and has an actuator arranged therewith. The second lens element images the laser beam from the first lens with a second (positive) focal length along the optical axis. The actuator is configured to move the second lens in the head along the optical axis over a variable lens distance relative to the first lens. The third lens element is disposed in the head and images the laser beam from the second lens element with a third (positive) focal length along the optical axis to a focal point. The third focal length is greater than the second focal length, and the focal point is variable along the optical axis over a variable focal distance in relation to the variable lens distance.

The head can comprise a housing having an input and an output for the laser beam along the optical axis. The first and third lens elements are fixedly mounted in the housing, whereas the second lens element is movably mounted in the housing in connection with the actuator.

The foregoing summary is not intended to summarize each potential embodiment or every aspect of the present disclosure.

BRIEF DESCRIPTION OF THE DRAWINGS

FIG. 3A illustrates schematic view of a laser processing head having another lens arrangement according to the present disclosure.

FIG. 3B illustrates a detail of the lens arrangement in FIG. 3A.

DETAILED DESCRIPTION OF THE DISCLOSURE

Figures 1A, 1B, 1C:
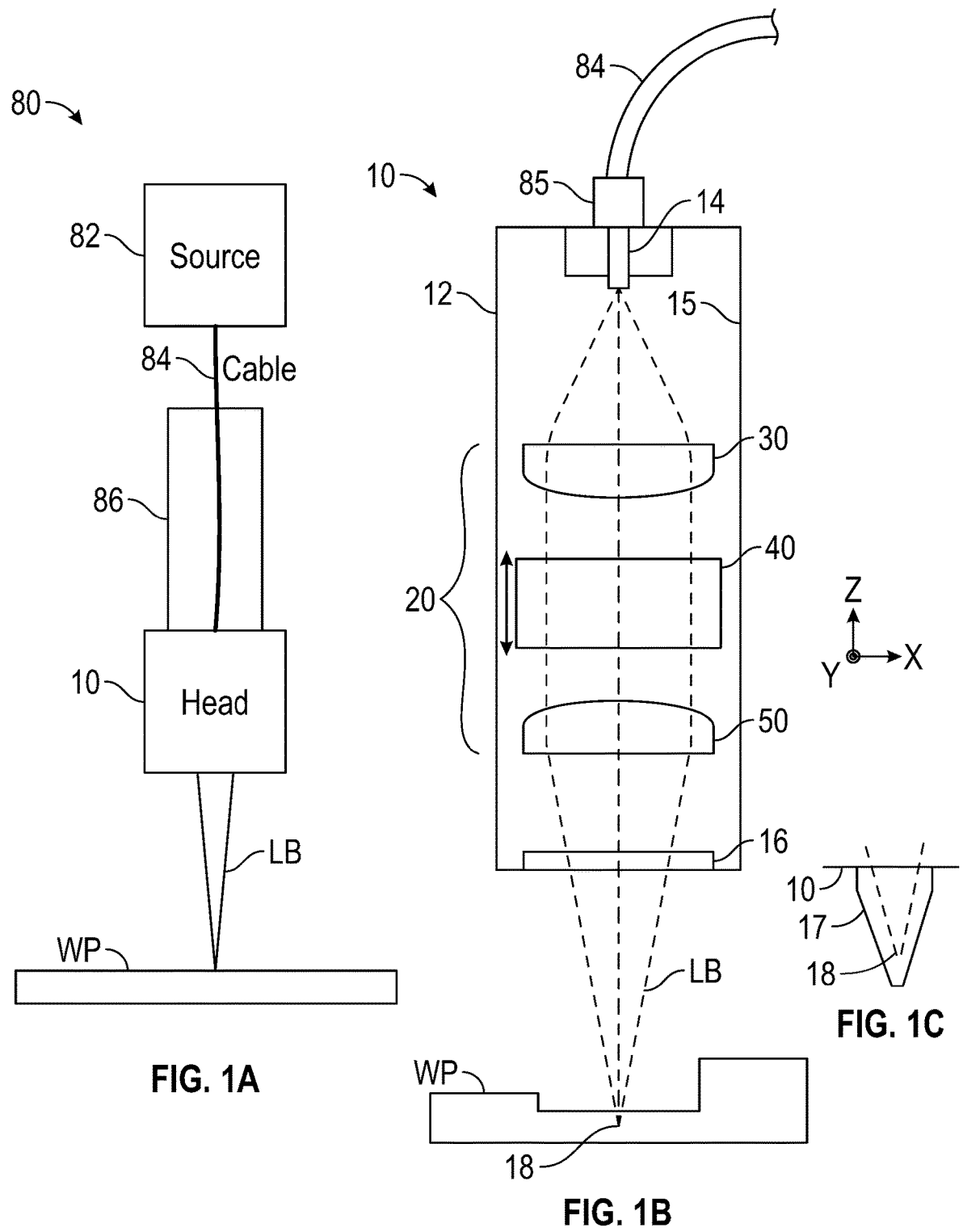
FIG. 1A illustrates a laser delivery system according to the present disclosure.
FIGS. 1B-1C schematically illustrate a laser processing head according to the present disclosure.

FIG. 1A illustrates a laser delivery system 80 according to the present disclosure. A laser source 82 generates high-power laser light that is propagated along a fiber optic cable 84 to a laser processing head 10. The laser source 82 can be an suitable multi-mode or a single-mode laser depending on the laser power required.

The laser processing head 10 can be moved relative to a workpiece WP and/or can have the workpiece WP moved relative to it. For example, the laser processing head 10 can be moved by a gantry system, robotic arm, or other apparatus 86 used in the art. Internally, the laser processing head 10 includes optics to focus the laser energy in a laser beam LB to the workpiece WP to achieve cutting, brazing, welding, additive manufacturing, or some other lasing process.

FIG. 1B schematically illustrates the laser processing head 10 according to the present disclosure. The laser processing head 10 includes a housing 12 for internal optics of a lens arrangement 20. A receiver 85 at one end of the housing 12 can couple to the laser cable 84, which conducts the laser light into the head 12. An output 16 at the other end of the housing 12 allows a focused laser beam LB to be emitted from the housing 12 for achieving the purposes of the lasing operation, such as welding, additive manufacture, cutting, etc. To protect the internal optics inside the housing 12, the output 16 can include a cover slide that acts as a transparent pressure window.

During operation, the input 14 (e.g., a high-power laser delivery fiber) in the head 10 emits a high-power laser beam LB in the housing 12. In a general sense, a fixed input lens element 30 images the laser beam LB to a second, movable lens element 40. In turn, the movable lens element 40 images the laser beam LB to a fixed focusing lens element 50, which focuses the laser beam LB to pass through the protective cover slide of the output 16. The beam LB is focused to a focal point or spot 18, and the laser beam LB then impinges on or near the workpiece WP or some other desired process zone. (Depending on the laser process and the type of head 10, the focal point 18 can be located at or near the workpiece WP, inside a nozzle 17 as in FIG. 1C attached to the head, or at some other location along the optical axis that suites the process at hand.)

In a more technical sense, the first lens element 30 creates an image (typically a virtual image), which is de-magnified and serves as an object for the second lens element 40. In turn, the second lens element 40 images this de-magnified object to close to infinity. Therefore, when the second lens element 40 is in a neutral position, the image created by the second lens element 40 is at infinity. Finally, the last lens element 50 images this new object from infinity to the focal plane of the last lens element 50, forming the focal point 18 for the materials processing operation.

Movement of the second element 40 moves the virtual object for the last lens element 50 away from infinity and therefore results in a movement of the final focal point 18. Demagnification of the intermediate object after first lens element 30 means, that for a given total magnification of the head 10, the remaining optics consisting of second and third lens elements 40, 50 must have a larger magnification M2. Moving the second lens element 40 is mostly equivalent to moving the virtual object. First order optics shows that this movement is translated to a movement of the focal point 18 by roughly M2*M2, meaning that the movement of the second lens element 40 can be much smaller than the resulting movement of the spot 18.

The laser processing head 10 can be used in a laser process in which the focal point 18 of the laser beam LB can be adjusted in the optical axis (i.e., Z-axis) relative to a workpiece WP for laser cutting, welding, soldering, surface treatment, tactile brazing, additive manufacturing processes, and the like. The movable lens element 40 permits the focal point 18 of the laser beam LB to be adjusted along the optical axis. In this way, the focal point 18 can be adjusted to the different contours of the workpiece WP or to different process zones needed for the lasing process. This adjustment along the optical axis Z can be performed while the head 10 remains stationary relative to the workpiece WP, while the head 10 moves in the X-Y plane relative the workpiece WP, while the head 10 is also moved along the Z-axis, or when a combination of such movements are performed.

Figure 2A:
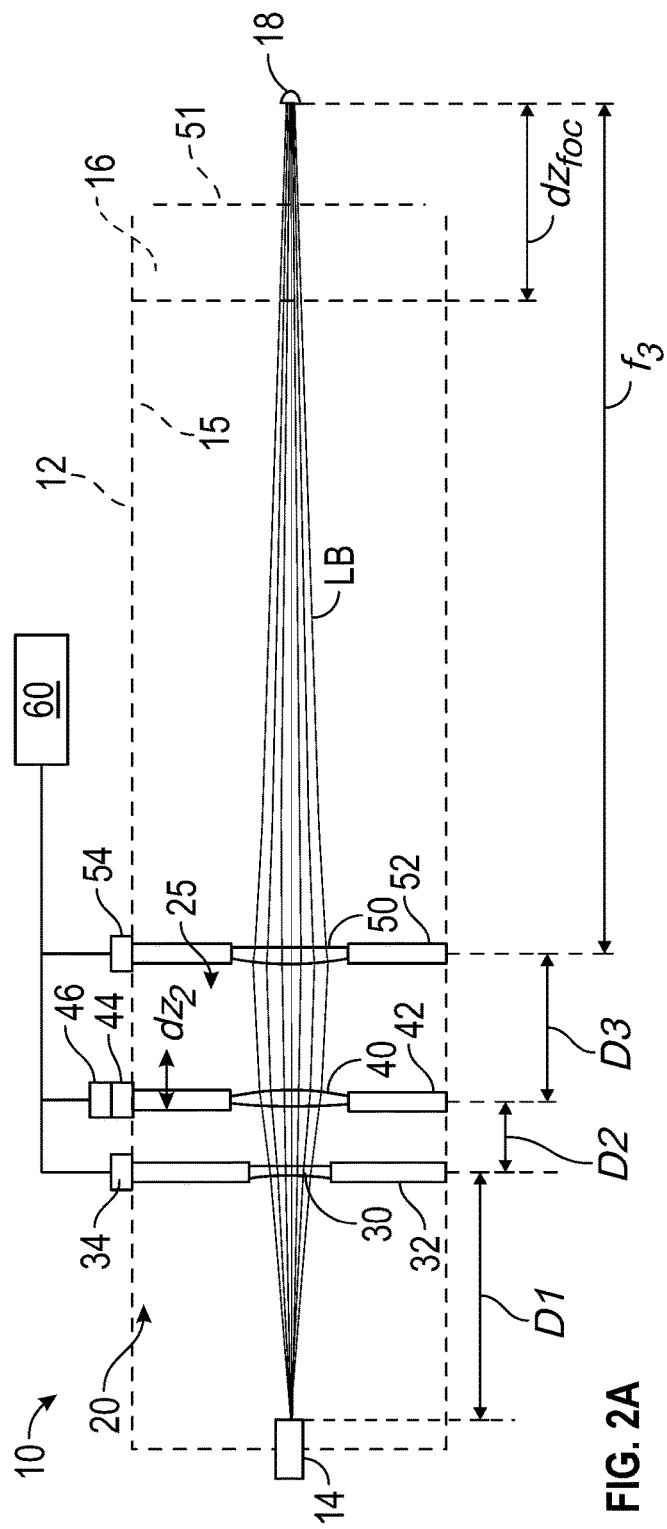
FIG. 2A illustrates a schematic view of a laser processing head having a lens arrangement according to the present disclosure.

FIG. 2A illustrates more detail of a laser processing head 10 having a lens arrangement 20 according to the present disclosure. As noted, the head 10 focuses a laser beam LB to the focal point 18. The focal point 18 can be adjusted relative to a focal plane 51, which can be outside or inside the head 10 (or component thereof, such as a nozzle) depending on the lasing process. As only schematically shown here, the head 10 includes the housing 12 having the input 14 and the output 16 for the laser beam LB to pass along the optical axis A. In an interior 15, the housing 10 includes the lens arrangement 20 with lens elements 30, 40, 50 disposed in the interior 15 of the housing 10. In general, each of the lens elements 30, 40, 50 can include one lens, but they may also comprise a group of multiple lenses, composite lenses, or optical elements in the form of a lens group. (Reference to a lens may be used herein for the purpose of description, but it should be appreciated that each of the lens elements 30, 40, 50 can include one or more lenses or optical elements.) In one arrangement, the first, input lens element 30 is mounted in the housing's interior 15 using a fixed mounting structure 32; the second, intermediate lens element 40 is mounted in the housing's interior 15 using a movable mounting structure 42; and the third, focusing lens element 50 is mounted in the housing's interior 15 using a fixed mounting structure 52.

The input mounting structure 32 is in a fixed position in the housing 10 so that the input lens element 30 is set at a first distance $D_1$ from the input 14, which can include an optical fiber input suited to the high-power laser of the head 10. The intermediate mounting structure 42, by contrast, is mounted in conjunction with an actuator 46 operable to adjust the position of the intermediate lens element 40 in the housing 10 along the optical axis A. In this way, the second distance $D_2$ of the intermediate lens element 40 relative to the input lens element 30 can be controlled and varied. Finally, the output mounting structure 52 is in a fixed position in the housing 10 so that the output lens element 50 is set at a distance ($D_2+D_3$) from the input lens element 30. The output lens element 50 focuses the laser beam LB to a focal point 18 that can be varied a variable distance $dz_{foc}$ relative to a focal plane 51 of the output lens element 50. (In FIG. 2A, the focal point 18 is shown beyond the focal plane 51 of the output lens element 50 at the most distanced boundary (right in the drawing) of the range for the variable distance $dz_{foc}$. This means also that the intermediate lens element 40 is shown in FIG. 2A at its farthest boundary (left in the drawing) of its movement range from the output lens element 50. The laser beam LB between the intermediate and output lens elements 40 and 50 diverges. Although not shown, when the intermediate lens element 40 is positioned at its closest boundary (right in the drawing) of its movement range toward the output lens element 50, then the focal point 18 would be inside the focal plane 51 of the output lens element 50 at the shortest boundary (left in the drawing) of the range for the variable distance $dz_{foc}$. The laser beam LB between the intermediate and output lens elements 40 and 50 would converge in this instance.)

In general, the focal point 18 can be beyond the housing's output 16, but the focal point 18 does not necessarily have to be outside of the housing "proper", depending on the type of housing used and any additional components used on the head 10. In two-dimensional flat sheet cutting, for example, the focus of the laser beam LB is controlled with respect to a cutting gas nozzle affixed on an end of the head 10. During use, the focal point 18 can be both inside, at, or outside this nozzle. The actuator 46 on the intermediate lens element 40 can adjust/control the third distance $D_3$ of the intermediate lens element 40 to the output lens element 50 in direct offset to the adjustment to the second distance $D_2$.

Figure 2B:
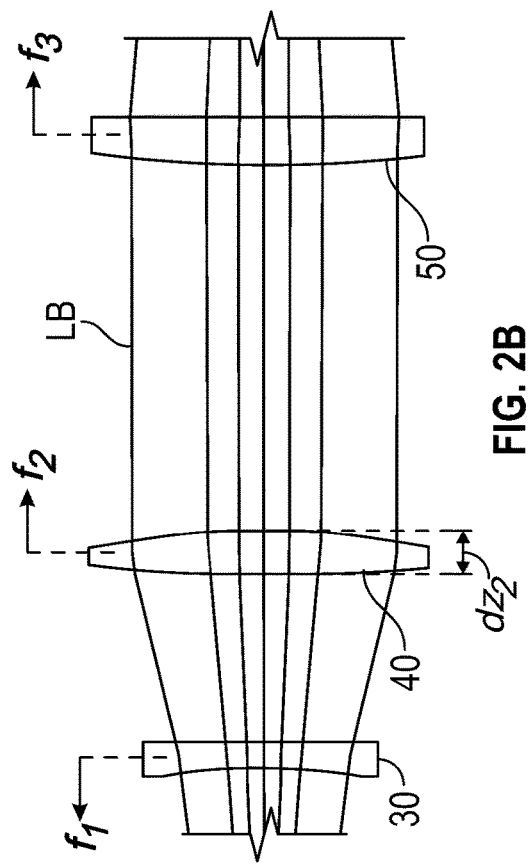
FIG. 2B illustrates a detail of the lens arrangement in FIG. 2A.

As also shown in the detail of the lens arrangement 20 in FIG. 2B, the input lens element 30 images the laser beam LB from the input 14 with a first, input focal length $f_1$ along the optical axis A. In one configuration, the input focal length $f_1$ is negative. The intermediate lens element 40 images the laser beam LB from the input lens element 30 with a second, intermediate focal length $f_2$ along the optical axis A. The intermediate focal length $f_2$ is positive. As noted, the actuator 46 is configured to move the intermediate lens element 40 in the head 10 along the optical axis A at a variable lens distance $dz_2$ relative to the input and output lens elements 30, 50.

In contrast to the previous configuration, the input focal length $f_1$ can instead be positive when the head 10 has a very large magnification, such as for magnifications greater than about 6×. The range of parameters disclosed herein for the head 10 can include these large magnifications, which may be useful for cutting processes.

The output lens element 50 images the laser beam LB from the intermediate lens element 40 with a third, output focal length $f_3$ along the optical axis A to the focal point 18. The output focal length $f_3$ is positive. The focal point 18 is variable over a variable focal distance $dz_{foc}$ along the optical axis A in relation to the increase/decrease of the variable lens distance $dz_2$ of the intermediate lens element 40 relative to the input and output lens elements 30, 50. Moving the lens element 40 towards the output lens element 50 will move the focal point 18 toward the output lens element 50, and moving the intermediate lens element 40 away from the output lens element 50 will move the focal point 18 away from the output lens element 50.

Because the laser head 10 is used for high-power lasing, cooling of one or more of the lens elements 30, 40, and 50 can increase imaging performance of the head and can help prevent adverse effects. Preferably, the head 10 includes at least one cooling arrangement disposed in the housing 10. The at least one cooling arrangement is disposed in thermal communication with at least one of the lenses 30, 40, 50 and is configured to cool the associated lens element 30, 40, 50.

The outer stationary lens elements 30 and 50 allow for good sealing of an optics room 25 in the head 10 and can be cooled efficiently. The optics room 25 for the lens elements 30, 40, 50 is preferably sealed and is preferably as small as possible, which facilitates cooling and sealing. When using lens material having high thermal conductivity such as sapphire ($Al_2O_3$), zinc sulfide (ZnS), these lens elements 30 and 50 are very resistant to contamination. Due to the small movement range of the intermediate movable lens element 40 made possible for the reasons noted above, active cooling is at least easier for it as well. In addition, the small movement range allows for a very fast adjustment of the focal point 18.

At least in one configuration, for example, the input lens element 30 includes a cooling element 34 because this input lens element 30 is subject to more concentrated imaging of the laser beam LB from the input 14 and may be subject to the most heating per unit surface area. In another configuration, the first and third lenses 30, 50 include cooling elements 34, 54 configured to cool the associated lens elements 30, 50 because these lens elements 30, 50 are mounted in a fixed position in the housing 12, making the cooling elements 34, 54 easier to incorporate into the mounting structure 32, 52.

In yet another configuration, each of the lens elements 30, 40, 50 includes a cooling element 34, 44, 54 disposed in thermal communication therewith and configured to actively cool the associated lens element 30, 40, 50. In general, the cooling elements 34, 44, 54 can include thermoelectric cooling elements on the mounting structures 32, 42, 52.

Because the input and output lens elements 30, 50 are fixed in the head 10 with mounting structures 32, 52, any desired sensors can be more readily used for monitoring these stationary lens elements 30, 50. Such sensors (not shown) can include a temperature sensor, a viewing sensor, or other form of detector to monitor the health of the lens element 30, 50. Such a sensor requires certain wiring or cabling that can be simplified for these fixed mounts of the mounting structures 32, 52. Moreover, the input and output lens elements 30, 50 being fixed in the head 10 with the mounting structures 32, 52 simplifies how the associated cooling element 34, 54 can be incorporated into (onto) the mounting structure 32, 52 and adjacent housing 12. A number of mounting structures 32, 42, 52 can be used for the lens elements 30, 40, 50. For example, the fixed position mounting structures 32, 52 can use components such as lens tubes, screw rings, and clamped mounts. The lens elements 30, 40, 50 can be mounted with seals and can be held in place in the mounting structures 32, 42, and 52.

Figure 2C:
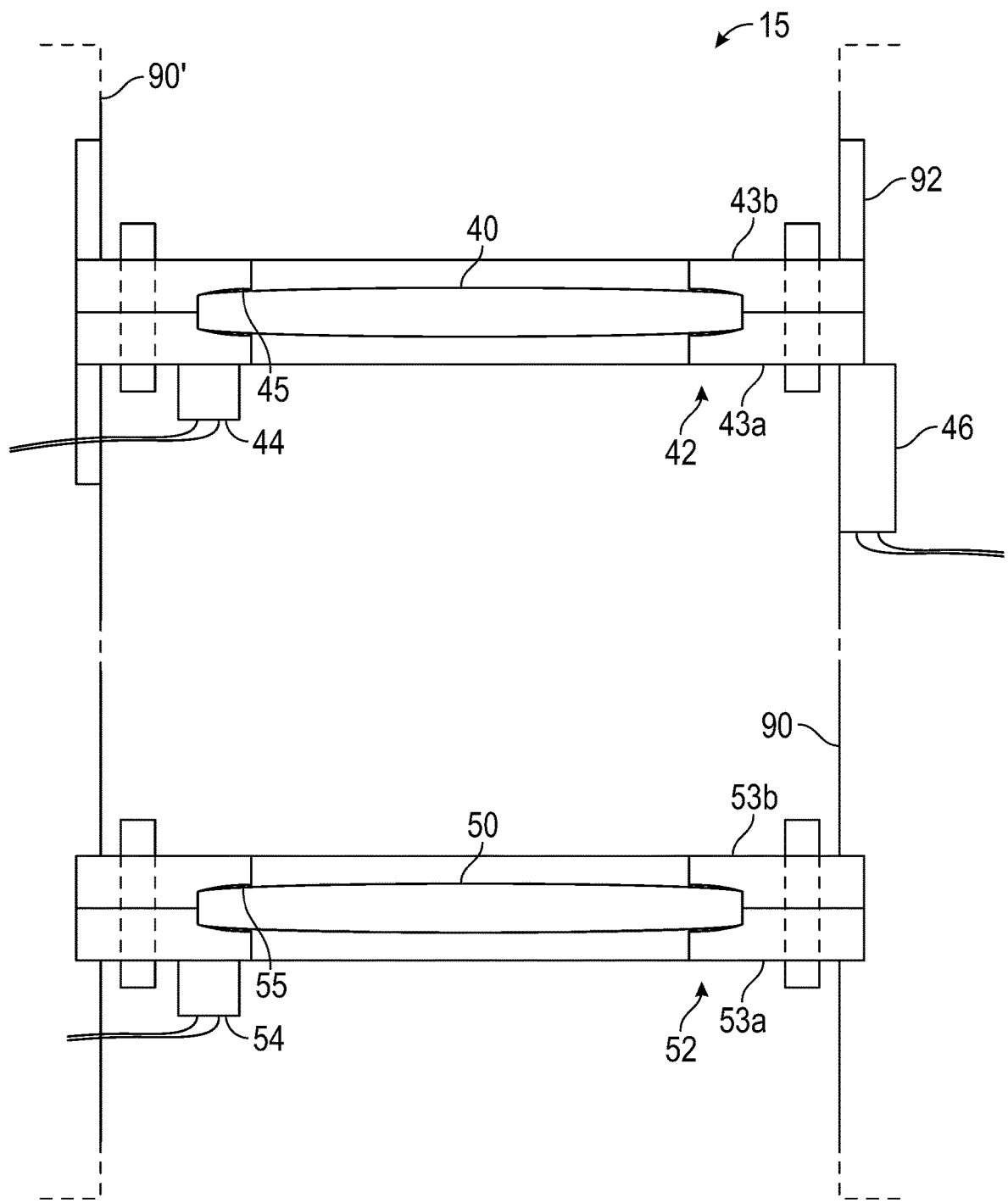
FIG. 2C schematically illustrates a lens, a fixed mounting structure, and a cooling element of the present disclosure and schematically illustrates a lens, a movable mounting structure, a cooling element, and an actuator of the present disclosure.

Briefly, FIG. 2C schematically illustrates details of a fixed lens element (e.g., 50), a fixed mounting structure 52, and a cooling element 54 of the present disclosure. Here, the mounting structure 52 is a clamp-type mount with clamp elements 53*a-b* affixed together and holding the lens element 50 therein. Sealing at 55 can be used to fix the lens element 50 in the clamp elements 53*a-b*. The mounting structure 52 can be affixed or mounted in the interior 15 of the housing using conventional features (not shown). For example, a module element 90 may be mounted in the interior 15.

The cooling element 54, such as one or more thermoelectric cooling elements, can be disposed on (or disposed in) the clamp type mount 52. As will be appreciated with the benefit of this example, a number of mounting structures and arrangements can be used to mount the fixed lenses (30, 50) in the head's housing.

Briefly, FIG. 2C also schematically illustrates details of the movable lens (e.g., intermediate lens element 40), a movable mounting structure 42, a cooling element 44, and an actuator 46 of the present disclosure. Here, the mounting structure 42 is a clamp-type mount with clamp elements 43*a-b* affixed together and holding the lens element 40 therein. Sealing at 44 can be used to fix the lens element 40 in the clamp elements 43*a-b*. The mounting structure 42 can be mounted in or on a rail, track, or other guide in the interior 15 of the housing using conventional features. For example, a module element 90' may be mounted in the interior 15 and can include the guide 92. This module element 90' can be part of the same module used for output lens and/or the input lens.

The cooling element 44, such as one or more thermoelectric cooling elements or water cooling arrangements, can be disposed on (or disposed in) the clamp type mount 42. The actuator 46, which can include one or more elements, can be mounted with respect to the housing's interior 15 in conjunction with the mount 42 on one or more locations or sides of the mount 42. The actuator 46 can move the mount 42 along the guide 92, track or the like to adjust the position of the lens element 40. As will be appreciated with the benefit of this example, a number of mounting structures and arrangements can be used to mount the movable lenses (40) in the head's housing.

Because the intermediate lens element 40 as shown in FIGS. 2A-2B is movable at a small variable lens distance $dz_2$ in the head 10 by operation of the actuator 46, any desired sensors (not shown) can still be used for monitoring this lens element 40 even with its movement. Such sensors can include a temperature sensor, a viewing sensor (i.e., photodiodes), or other form of detector to monitor the health of the lens. Such a sensor requires certain wiring or cabling that can be simplified for the mounting structure 42 that moves only the small variable lens distance $dz_2$. Moreover, the intermediate cooling element 44 can still be incorporated into the mounting structure 42, and the cooling element 44 and mounting structure 42 can be moved by the actuator 46.

As shown in FIG. 2A, the actuator 46 for the intermediate lens element 40 is controlled by a controller 60. Preferably, the actuator 46 allows for highly dynamic control to achieve the small movement $dz_2$ of the intermediate lens element 40 along the optical axis A. The actuator 46 can include one or more unidirectional mover, bi-directional mover, motor, solenoid, piezoelectric element, linear motor, voice coil motor, or other device having precise, controlled movements over a short distance. Movement over the small distance $dz_2$ can be achieved with one actuator 46 capable of bi-directional movement. Alternatively, opposing unidirectional actuators 46 can be disposed on opposing sides of the mounting structure 42 to achieve the bi-directional movement. The actuator 46 can be combined with bearings, joints, guides, biasing elements, springs, and any other necessary mechanical features to control movement. Overall, the actuator 46 can use any form of mechanical or electromechanical actuation that has fine precision and accuracy and that can accommodate cooling. Any of the cooling elements 34, 44, 54 in the head 10 can also be controlled by the controller 60, which can be a microcontroller specifically associated with the head 10 or can be part of a larger control system for a laser delivery system (e.g., 80: FIG. 1A).

The controller 60 operates the actuator 46 to adjust the position of the intermediate lens element 40 along the small variable lens distance $dz_2$, which in turn adjust the focus position 18 of the laser beam LB along the larger variable focal distance $dz_{foc}$. As noted, this focus position 18 can be adjusted relative to surfaces of a workpiece, while the head 10 is stationary relative to the workpiece, while it moves relative to the workpiece, etc.

Adjusting the focus position 18 can be used in a number of ways during laser processing of the workpiece. While the head 10 is stationary relative to the workpiece, movement of the intermediate lens element 40 along the small variable lens distance $dz_2$ can adjust the focus position 18 with respect to surfaces of the workpiece. While the head 10 is moved along an axis consistently with respect to the workpiece or vice versa, movement of the intermediate lens element 40 along the small variable lens distance $dz_2$ can adjust the focus position 18 with respect to surfaces of the workpiece. (In other words, the focal point 18 can be moved relative to the head 10 during operations. If the head 10 is stationary, the focal point 18 can be moved relative to both workpiece and head 10. If the head 10 is moved relative to the workpiece and if at the same time focal point 18 is moved relative to the head 10, the focal point 18 can be kept stationary with respect to the workpiece while moving the head 10. These and other combinations of movement can be used.) Moreover, using the actuator 46 suitable for the small range of movement over the variable lens distance $dz_2$, the intermediate lens element 40 can be further operated to have high frequency oscillations in the head 10, which produces high frequency oscillations of the focal point 18 along the optical axis A. These and any other combinations of adjustments can be used by actuating the intermediate lens element 40.

For optical control and as best shown in FIG. 2B, the input focal length $f_1$ is negative; the intermediate focal length $f_2$ is positive, and the output focal length $f_3$ is positive. The output optical length $f_3$ is greater than the intermediate focal length $f_2$. Typically, a movement range of the intermediate lens element 40 can be less than about 15 mm, and the spot movement can be larger than 60 mm. In general, the third focal length $f_3$ can greater than the second focal length $f_2$ such that a ratio of $|f_3/f_2|$ can be at least two (2).

With this optical arrangement, the laser beam LB after the first two lenses 30, 40 is close to being collimated. The input lens element 30 creates a smaller virtual image of the fiber tip of the input 14, and this smaller virtual image is then imaged by the intermediate lens element 40 and the output lens element 50 towards the workpiece.

Due to the reduced virtual image from the input lens element 30, this initial part of the laser beam LB has a large magnification. Therefore, the ratio of the output focal length $f_3$ relative to the intermediate focal length $f_2$ is so large that a very small movement of the intermediate lens element 40 along the variable lens distance $dz_2$ results in a large movement of the focus position 18 along the variable focal distance $dz_{foc}$. For typical adjustment required to focus position that would be used in 2-D sheet metal cutting, the required lens movement distance $dz_2$ can be on the order of a few millimeters, allowing for highly dynamic adjustments of the laser beam's focal point 18.

In general, the input lens element 30 can be composed of sapphire ($Al_2O_3$), zinc sulfide (ZnS), or other material having "high" thermal conductivity (e.g., glass having thermal conductivity at least as great as sapphire, or zinc sulfide). In general, the thermal conductivity of aluminum oxide or sapphire varies based on temperature and orientation, but can be about 24 W/(m*K). In general, the thermal conductivity of zinc sulfide varies based on temperature, but can be about 16.7 W/(m*K) at 20° C. These values are only meant to represent possible examples for the high thermal conductivity desired for the lens material. The output lens element 50 can also be composed of sapphire, zinc sulfide, or other material (e.g., glass having high thermal conductivity of at least as great as sapphire, or zinc sulfide).

For its part, the intermediate lens element 40 can be composed of sapphire, zinc sulfide, or other material (e.g., glass having high thermal conductivity of at least as great as sapphire, or zinc sulfide). Instead of being composed of sapphire, or zinc sulfide, however, normal fused silica may be used in some or all of the lenses 30, 40, 50 to reduce costs or improve manufacturability with the tradeoff of reduced contamination resistance.

At least one of the lens elements 30, 40, 50 can be aspherical. In one configuration, the input lens element 30 is a spherical lens; the intermediate lens element 40 is an aspherical lens; and the output lens element 50 is either spherical or aspherical. For example, either the intermediate lens element 40, the output lens element 50, or both can be aspheric to reduce imaging error. If sapphire or zinc sulfide is used for both of the input and output lens elements 30, 50, the lens arrangement 20 having a single aspheric lens can be sufficient.

The focal lengths, the distances, and the optical diameters for the lens elements 30, 40, 50 depends on the size of the housing 12, the optical power of the laser beam LB, and other operational characteristics. The configuration can be generally characterized by a number of interrelated relationships discussed below.

As noted, the input lens element 30 has a first focal length $f_1$; the intermediate lens element 40 has a second focal length of $f_2$; and the output lens element 50 has a third focal length $f_3$. The lens' variable distance $dz_2$ represents the movement range for the intermediate lens element 40, and the expanse $dz_{foc}$ is the movement range of the focal point 18 around the focal plane of the output lens element 50. Based on these variables, the focal length $f_2$ of the intermediate lens element 40 can be characterized by:

$$f_2 = \sqrt{\frac{dz_2}{dz_{foc}}}$$

The focal length $f_3$ of the output lens element 50 corresponds to about the working distance of the head 10. The collimated focal length $f_{col}$ grouped for the input lens element 30 relative to the intermediate lens element 40 at the neutral position is characterized by:

$$f_{col} = \frac{f_3}{M}$$

The variable M is the magnification involved. Given the distance $D_2$ between input lens element 30 and the intermediate lens element 40. The focal length $f_1$ of the input lens element 30 is characterized by:

$$f_1 = \frac{1 - \frac{D_2}{f_2}}{\frac{1}{f_{col}} - \frac{1}{f_2}}$$

Finally, the distance $D_1$ from the input 14 of the fiber tip to the input lens element 30 is characterized by:

$$D_1 = \frac{1 - \frac{D_2}{F_2}}{\frac{1}{f_1} + \frac{1}{f_2} - \frac{D_2}{f_1 * f_2}}$$

Actual values for these parameters of the head 10 will depend on the particular implementation. Below is a brief discussion of some typical parameter values.

In general, the third focal distance $f_3$ (i.e., working distance) can be greater than or equal to 200-mm and can be about 200-mm to 500-mm, resulting in a large working distance and large beam diameters for large laser power operation of the head 10. The variable focal distance $dz_{foc}$ that the focal point 18 can vary along the optical axis can be from about 40-mm to 90-mm, depending on the requirements for cutting or other laser processes. The variable lens distance $dz_2$ of the intermediate lens element 40 can be in the range of about 5-mm to 15-mm. This gives the adjustments a high dynamic range and allows the intermediate lens element 40 to be more easily cooled. Overall, the variable focal distance $dz_{foc}$ can be about 2 to 18 times greater than the variable lens distance $dz_2$.

Continuing with the examples, the distance $D_2$ between the input lens element 30 and the intermediate lens element 40 can be about 20-mm to 100-mm so that the optics can be more compact in the head 10. The first distance $D_1$ from the fiber tip 14 to the input lens element 30 can be greater than 50-mm so that the input lens 20 is not located too close to the input fiber 14. These values discussed above are only presented as an example and can vary from one implementation to another depending on the characteristics.

In one particular configuration, the lens arrangement 20 can be sized and used for the head 10 having the housing 12 with an overall distance of the laser beam LB of about 480-mm from the input 14 to the output (e.g., nozzle) of the head 10. The input distance $D_1$ can be about 100-mm; the distance between the input lens element 30 and the outlet lens element 50 (i.e., distances $D_2+D_3$) can be about 80-mm; the distance between input lens element 30 and movable lens element 40 (distance $D_2$) can be about 30 mm; and the working distance $f_3$ can be 300-mm. Thus, when the working distance $f_3$ is about 300-mm, the magnification M at a Z position −20-mm can be about 1.73×, whereas the magnification M at a Z position +40-mm can be about 2.14×.

With these dimension, the beam diameter of the laser beam LB at the input lens element 30 can be about 30-mm, and the beam diameter at the intermediate lens element 40 can be about 40-mm with typical cutting laser sources with a beam parameter product (BPP) of about 4 mm*mrad. As noted, the laser beam LB is practically collimated between the intermediate lens element 40 and output focusing lens element 50.

With these dimension, the intermediate lens element 40 can be varied along a variable lens distance $dz_2$ of about ±2 mm. As already noted, the small movement needed for the intermediate lens element 40 allows the optics room 25 to be more readily sealed from the mechanics of the actuator 46, to be more readily cooled, and to be easily fine-tuned.

FIG. 3A illustrates a laser processing head 10 having another lens arrangement 20 according to the present disclosure, and FIG. 3B shows a detail of the lens arrangement 20 in FIG. 3A. This head 10 and lens arrangement 20 is similar to the previous configuration of FIGS. 2A-2B so that similar reference numbers are used for comparable components. Description of these comparable components is reincorporated here, but may not be repeated below.

As before, the lens arrangement 20 has three lens elements 30, 40 and 50, which can each include one lens or group of lenses or optical elements. The first, input lens element 30 has a negative focal length $f_1$, is actively cooled, is stationary in the optical axis A, and is composed of a material having a high thermal conductivity. For example, the input lens element 30 can be composed of sapphire, or zinc sulfide. (As noted previously, the first focal length can be positive when the head 10 has a magnification greater than about 6× in some configurations.) The third, output lens element 50 has a positive focal length $f_3$, is actively cooled, is stationary in the optical axis A, and is composed of a material with a high thermal conductivity as noted herein.

As before, the second, intermediate lens element 40 has a positive focal length $f_2$ and can be moved along the optical axis A using the actuator 46. The intermediate lens element 40 can also be cooled with a cooling element 44. Again, the intermediate mounting structure 42 is mounted in conjunction with the actuator 44 operable to adjust the position of the intermediate lens element 40 in the housing 10 along the variable lens distance $dz_2$ of the optical axis A.

The intermediate lens element 40, however, includes a number of differences in contrast to the previous arrangements. In particular, the intermediate lens element 40 is mounted in the mounting structure 42 as a lens group further including a pair of cover slides 41a-b. The lens 41 for the element 40 in this configuration can be composed of a different material than the other configurations and can, for example, be composed of a fused silica. This intermediate lens 41 of the element 40 is sandwiched between the cover slides 41a-b, which can be composed of sapphire, zinc sulfide, or other material of "high" thermal conductivity noted herein. This configuration may make tradeoffs as to size, weight, and performance compared to the previous configuration, the lens arrangement 20 here can still be kept cleaner from contamination. The intermediate lens 41 can be composed of fused silica, which is a less expensive material, and can be aspherical. The aspherical, fused silica lens 41 sandwiched between the two sapphire cover slides 41a-b therefore provides for reduced manufacturing costs, yet can keep the configuration clean from contamination. The cover slides 41a-b seal the aspherical lens 41 in a small volume to keep the lens 41 clean. Contamination from outside is handled by the contamination resistant sapphire, or zinc sulfide of the cover slides 41a-b.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A laser processing head configured to transmit a laser beam along an optical axis of the laser processing head and to focus the laser beam at a focal point, the laser processing head comprising:
   an input configured to receive the laser beam from a laser source;
   a first lens element mounted in a first fixed position in the laser processing head and configured to receive and image the laser beam directly from the input, the first lens element having a first focal length along the optical axis;
   a second lens element configured to receive and image the laser beam directly from the first lens element, the second lens element having a second focal length along the optical axis, the second focal length being positive;
   an actuator configured to move the second lens element a variable lens distance along the optical axis; and
   a third lens element mounted in a second fixed position in the laser processing head and configured to receive the laser beam directly from the second lens element and image the laser beam to the focal point, the third lens element having a third focal length along the optical axis, the third focal length being positive and being greater than the second focal length by at least a factor of two, wherein:
   the focal point is configured to vary over a variable focal distance along the optical axis as a function of the variable lens distance, and
   the actuator is configured to move the second lens element along the optical axis relative to the first lens element mounted in the first fixed position and relative to the third lens element mounted in the second fixed position.

2. The laser processing head of claim 1, wherein the first lens element comprises a spherical lens.

3. The laser processing head of claim 1, wherein:
   the first focal length is positive, and
   the laser processing head has a magnification of 6× or greater.

4. The laser processing head of claim 1, wherein:
   the first lens element comprises a lens, and
   the lens is made of at least one of fused silica, sapphire, zinc sulfide, or a material having a thermal conductivity at least as great as a thermal conductivity of at least one of sapphire or zinc sulfide.

5. The laser processing head of claim 1, wherein:
   the second lens element comprises a lens, and
   the lens is made of at least one of fused silica, sapphire, zinc sulfide, or a material having a thermal conductivity at least as great as a thermal conductivity of at least one of sapphire or zinc sulfide.

6. The laser processing head of claim 1, wherein:
   the third lens element comprises a lens, and
   the lens is made of at least one of fused silica, sapphire, zinc sulfide, or a material having a thermal conductivity at least as great as a thermal conductivity of at least one of sapphire or zinc sulfide.

7. The laser processing head of claim 1, wherein:
   the first lens element and the third lens element together define an optics room in the laser processing head, and
   the optics room seals and encloses the second lens element.

8. The laser processing head of claim 1, wherein at least one of the second lens element or the third lens element comprise an aspherical lens configured to reduce imaging error.

9. The laser processing head of claim 1, further comprising a cooling arrangement in thermal communication with and configured to actively cool at least one of the first lens element, the second lens element, or the third lens element.

10. The laser processing head of claim 1, wherein the actuator comprises at least one of a unidirectional mover, a bi-directional mover, a motor, a linear motor, a solenoid, a voice coil, or a piezoelectric element.

11. A laser processing head configured to transmit a laser beam along an optical axis of the laser processing head and to focus the laser beam at a focal point, the laser processing head comprising:
    an input configured to receive the laser beam from a laser source;
    a first lens element mounted in a first fixed position in the laser processing head and configured to receive and image the laser beam directly from the input, the first lens element having a first focal length along the optical axis;
    a second lens element configured to receive and image the laser beam directly from the first lens element, the second lens element having a second focal length along the optical axis, the second focal length being positive;
    an actuator configured to move the second lens element a variable lens distance along the optical axis; and
    a third lens element mounted in a second fixed position in the laser processing head and configured to receive the laser beam directly from the second lens element and image the laser beam to the focal point, the third lens element having a third focal length along the optical axis, the third focal length being positive and being greater than the second focal length, wherein:
    the focal point is configured to vary over a variable focal distance along the optical axis as a function of the variable lens distance,
    the actuator is configured to move the second lens element along the optical axis relative to the first lens element mounted in the first fixed position and relative to the third lens element mounted in the second fixed position,
    the first focal length is negative,
    the first lens element is configured to image the input as a de-magnified object for the second lens element,
    the second lens element is configured to image the de-magnified object toward infinity as a resulting object, and
    the third lens element is configured to image the resulting object to a focal plane of the third lens element.

12. A laser processing head configured to transmit a laser beam along an optical axis of the laser processing head and to focus the laser beam at a focal point, the laser processing head comprising:
    an input configured to receive the laser beam from a laser source;
    a first lens element mounted in a first fixed position in the laser processing head and configured to receive and image the laser beam directly from the input, the first lens element having a first focal length along the optical axis;
    a second lens element configured to receive and image the laser beam directly from the first lens element, the second lens element having a second focal length along the optical axis, the second focal length being positive;
    an actuator configured to move the second lens element a variable lens distance along the optical axis; and
    a third lens element mounted in a second fixed position in the laser processing head and configured to receive the laser beam directly from the second lens element and image the laser beam to the focal point, the third lens element having a third focal length along the optical axis, the third focal length being positive and being greater than the second focal length, wherein:
the focal point is configured to vary over a variable focal distance along the optical axis as a function of the variable lens distance,
the actuator is configured to move the second lens element along the optical axis relative to the first lens element mounted in the first fixed position and relative to the third lens element mounted in the second fixed position,
the second lens element comprises a fused silica lens between a front cover slide and a back cover slide, and
the front cover slide and the back cover slide are each made of at least one of sapphire, zinc sulfide, or a material having a thermal conductivity at least as great as a thermal conductivity of at least one of sapphire or zinc sulfide.

13. A laser processing head configured to transmit a laser beam along an optical axis of the laser processing head and to focus the laser beam at a focal point, the laser processing head comprising:
an input configured to receive the laser beam from a laser source;
a first lens element mounted in a first fixed position in the laser processing head and configured to receive and image the laser beam directly from the input, the first lens element having a first focal length along the optical axis;
a second lens element configured to receive and image the laser beam directly from the first lens element, the second lens element having a second focal length along the optical axis, the second focal length being positive;
an actuator configured to move the second lens element a variable lens distance along the optical axis; and
a third lens element mounted in a second fixed position in the laser processing head and configured to receive the laser beam directly from the second lens element and image the laser beam to the focal point, the third lens element having a third focal length along the optical axis, the third focal length being positive and being greater than the second focal length, wherein:
the focal point is configured to vary over a variable focal distance along the optical axis as a function of the variable lens distance,
the actuator is configured to move the second lens element along the optical axis relative to the first lens element mounted in the first fixed position and relative to the third lens element mounted in the second fixed position, and
the variable focal distance is between 2 and 18 times, inclusive, greater than the variable lens distance.

14. A laser processing head configured to transmit a laser beam along an optical axis of the laser processing head and to focus the laser beam at a focal point, the laser processing head comprising:

a housing comprising an input and an output for the laser beam along the optical axis;
a first lens element mounted in a first fixed position in the housing and configured to receive and image the laser beam directly from the input, the first lens element having a first focal length along the optical axis;
a second lens element movably mounted in the housing, the second lens element being configured to receive and image the laser beam directly from the first lens element, the second lens element having a second focal length along the optical axis, the second focal length being positive;
an actuator configured to move the second lens element a variable lens distance along the optical axis; and
a third lens element mounted in a second fixed position in the housing and configured to receive the laser beam directly from the second lens element and image the laser beam to the focal point, the third lens element having a third focal length along the optical axis, the third focal length being positive and being greater than the second focal length, wherein:
the focal point is configured to vary over a variable focal distance along the optical axis as a function of the variable lens distance,
the actuator is configured to move the second lens element along the optical axis relative to the first lens element mounted in the first fixed position and relative to the third lens element mounted in the second fixed position, and
the first focal length is negative; or the first focal length is positive and the laser processing head has a magnification of 6× or greater.

15. The laser processing head of claim 14, further comprising at least one cooling arrangement in thermal communication with and configured to cool at least one of the first lens element, the second lens element, or the third lens element.

16. The laser processing head of claim 14, wherein:
the first lens element is a spherical lens; and
at least one of the second lens element or the third lens element comprises an aspherical lens configured to reduce imaging error.

17. The laser processing head of claim 14, wherein the second lens element comprises:
a lens made of at least one of sapphire, zinc sulfide, or a material having a thermal conductivity at least as great as a thermal conductivity of at least one of sapphire or zinc sulfide; or
a fused silica lens between a front cover slide and a back cover slide, the front cover slide and the back cover are each made of at least one of sapphire, zinc sulfide, or a material having a thermal conductivity at least as great as a thermal conductivity of at least one of sapphire or zinc sulfide.

* * * * *